United States Patent
Kemmochi et al.

(10) Patent No.: US 7,993,556 B2
(45) Date of Patent: Aug. 9, 2011

(54) METHOD FOR MAKING A SILICA GLASS CRUCIBLE

(75) Inventors: Katsuhiko Kemmochi, Camas, WA (US); Yasuo Ohama, Fukui (JP)

(73) Assignees: Heraeus Shin-Etsu America, Inc., Camas, WA (US); Shin-Etsu Quartz Products Co., Ltd., Tokyo (JP)

( * ) Notice: Subject to any disclaimer, the term of this patent is extended or adjusted under 35 U.S.C. 154(b) by 1024 days.

(21) Appl. No.: 11/835,568

(22) Filed: Aug. 8, 2007

(65) Prior Publication Data
US 2009/0041960 A1 Feb. 12, 2009

(51) Int. Cl.
*B29D 22/00* (2006.01)
(52) U.S. Cl. ............ 264/114; 65/144; 65/302; 65/17.3; 264/123; 264/125
(58) Field of Classification Search ............ 65/17.3, 65/144, 302; 264/114, 123, 125
See application file for complete search history.

(56) References Cited

U.S. PATENT DOCUMENTS

| | | | |
|---|---|---|---|
| 4,956,134 A * | 9/1990 | Luc | 264/410 |
| 4,963,178 A | 10/1990 | Brown et al. | |
| 5,082,484 A | 1/1992 | Koseki et al. | |
| 2002/0029737 A1 | 3/2002 | Sato et al. | |
| 2003/0012898 A1 | 1/2003 | Kemmochi et al. | |
| 2005/0120945 A1 | 6/2005 | Hansen | |

FOREIGN PATENT DOCUMENTS
JP 2000-219524 A 8/2000
* cited by examiner

*Primary Examiner* — Christina Johnson
*Assistant Examiner* — Xue Liu
(74) *Attorney, Agent, or Firm* — Marger Johnson & McCollom PC (57) ABSTRACT

A rotating mold has a plurality of air channels that communicate with a cavity formed in the mold. Silica grain is deposited in the rotating mold and then formed into the shape of a crucible having a lower portion that comprises a substantially uniformly thick wall. An upper portion of the grain is formed into a substantially narrowed wall portion about the perimeter of the formed shape. The silica grain is heated, and a pump draws gas through the air channels while the silica fuses. There is a pressure drop across the narrowed wall portion. After fusing, the upper portion of the crucible, including the narrowed wall portion, is cut off.

28 Claims, 6 Drawing Sheets

METHOD FOR MAKING A SILICA GLASS CRUCIBLE

BACKGROUND OF THE INVENTION

1. Field of the Invention

The present invention is related to the field of silica crucibles, and more specifically to a silica crucible having a wall in which bubbles and bubble growth are minimized when the crucible is heated to high temperatures.

2. Related Art

Silicon wafers used in semiconductor industries are made from ingots of single crystalline silicon. Such ingots generally are manufactured by the Czochralski (CZ) process. In the CZ process, metallic silicon is charged in a silica glass crucible housed within a suscepter located in a crystal growth chamber. The charge is then heated by a heater surrounding the suscepter to melt the charged silicon. A single silicon crystal is pulled from the silicon melt at or near the melting temperature of silicon.

At operating temperatures, the inner surface of a silica crucible reacts with the silicon melt. The inner layer of a silica glass crucible dissolves into the silicon melt during the CZ process. If there are bubbles in the inner layer, they may open to the melt by dissolution and be a source of particles that may disturb the single crystal structure of the pulled ingot. A bubble-free inner layer has been a critical requirement for a crucible adapted for CZ process use.

The same inventors in the present application are also inventors in pending U.S. application Ser. No. 11/223,158, filed Sep. 8, 2005, which is related to such a crucible and which is incorporated herein by reference for all purposes. The crucible in the pending application has an inner layer that is essentially bubble free and shows minimal bubble growth during the CZ process.

In prior art methods for making such crucibles, including the method in the pending application, when silica grain is fused to form the silica glass crucible, a large volume of gas is released from the grain at the fusion front. The method in the pending application relates to how efficiently this gas is drawn away (through channels that communicate with the inner mold surface) by optimizing the evacuation systems and heating systems. A powerful evacuation system with large diameter pipes and a powerful pump were used to implement an embodiment of the invention in the pending application.

Figure 1:
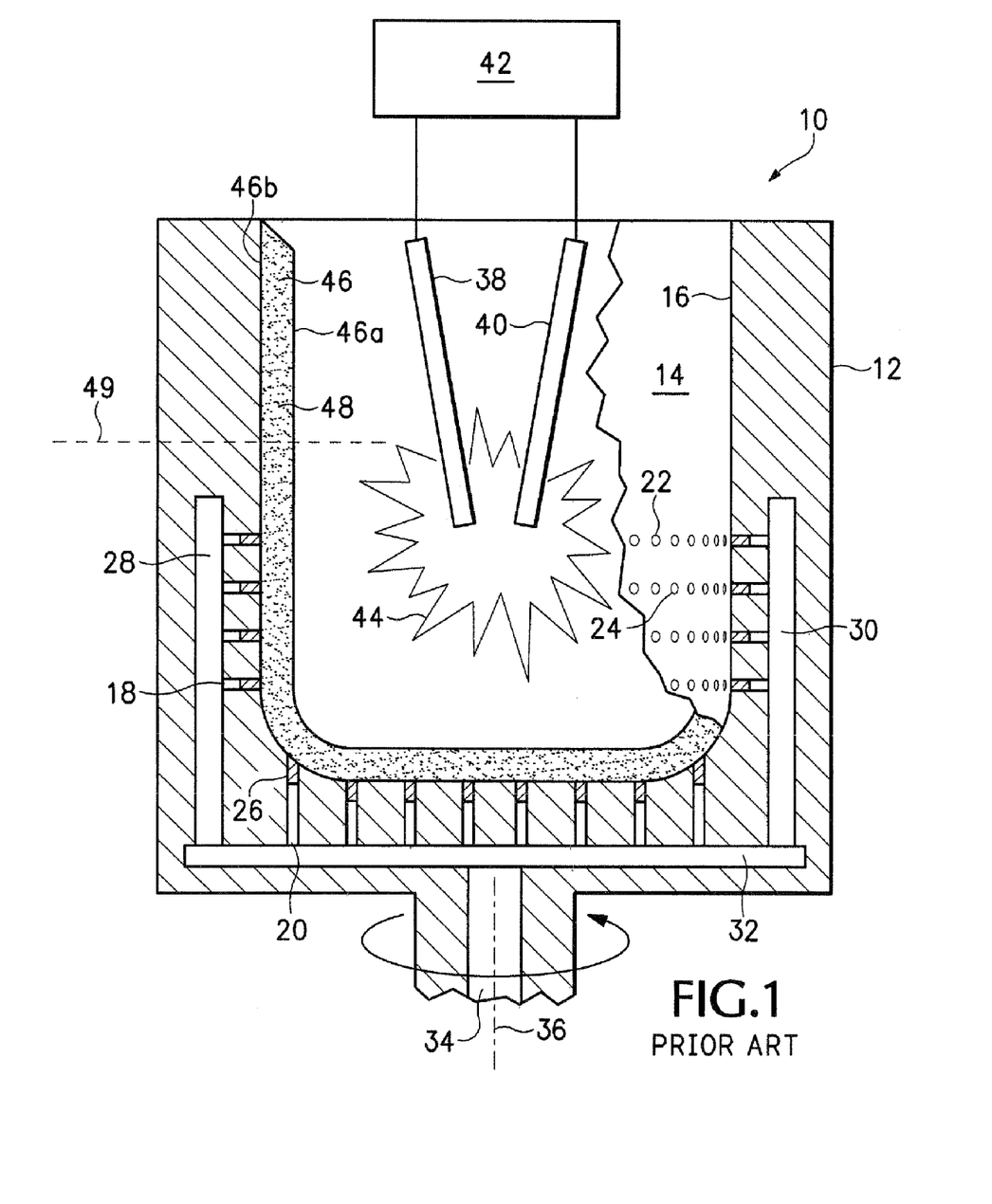
FIG. 1 is a cross-sectional, somewhat schematic view of a prior art crucible mold.

In the prior art, other techniques for minimizing bubbles and bubble growth also use pumps for rapidly drawing gas away from the fusion front. One such technique is illustrated in FIG. 1, which depicts a system, indicated generally at 10, for fusing a silica crucible. The system includes a mold 12 having an inner mold surface 14. Mold surface 14 is formed on a substantially cylindrical vertical wall 16.

A plurality of air channels, like air channels 18, 20 communicate with inner mold surface 14. Each air channel comprises a cylindrical bore that creates a circular opening, like openings 22, 24, on mold surface 14. Each air channel, like channel 20, includes a porous graphite plug, like plug 26, which prevents silica from being drawn from the mold cavity into the air channels. The air channels communicate with manifolds, like manifolds 28, 30, 32, which in turn communicate with a bore 34. A pump (not visible in the drawings) is connected to bore 34. The pump is configured to draw air from the mold cavity via the air channels and ultimately through bore 34 and out of system 10. The pump typically has a capacity of around 350 cubic meters per hour, although this prior art technique may be practiced with pumps outside this range depending on the conductivity of the channels, bores, manifolds, valves, and other structure disposed between mold surface 14 and the pump.

Mold 12 can be rotated by a motor (not shown) about a vertical axis 36. A set of conventional electrodes 38, 40 is vertically movable into and out of the mold interior. The electrodes are connected to a conventional DC power supply 42 that can apply power to the electrodes in a selectable range between about 300 KVA and 1200 KVA. When sufficient power is applied to electrodes 12, 14, an extremely hot plasma gas ball 44 forms around the electrodes.

Mold 12 contains a layer 46 of silica, which is shown partially broken away to expose mold surface 14. Layer 46 includes an inner layer 46a, which fuses when power is first applied to electrodes 12, 14, and an outer layer 46b. Together layers 46a, 46b comprise the wall of a crucible formed in the mold.

Generally describing the operation of system 10, natural quartz grain is placed in mold 12 as it rotates about axis 36. The outer layer of the crucible, i.e., the first grain received in the mold, may be doped with aluminum in a known manner. Once all the grain is received in the mold and shaped with a spatula (not shown in FIG. 1), power is applied to electrodes 38, 40 and the pump (not visible) is turned on. Once the electrodes heat the grain to the point where the grains on the innermost surface of wall 46a begin to fuse, a fusion front forms and proceeds over time from the innermost surface of the crucible to near mold surface 14, where the fusion front saturates. It is desirable to draw gas away from the fusion front at a high rate. This is accomplished in system 10 by creating a high crucible wall 48 that extends substantially all of the way between the upper level of mold openings, like opening 22, to the top of the mold, which is made taller than usual molds to facilitate creation of this tall wall 48.

When fusion first begins, gas is drawn along the radial axis of the mold through the silica in layer 46. But after layer 46a fuses, ambient gas is drawn only through the upper surface of wall 48. The relatively long distance from the upper surface of wall 46 to the first openings, where opening 22 is located, increases the resistance to pump flow. This, in turn, increases the pressure drop between the atmosphere above the upper surface of layer 46, on the one hand, and manifolds 28, 30, 32, on the other hand. As a result, gas formed at the fusion front between layer 46a and the inner surface of mold 14 is rapidly drawn away from the fusion front and into the manifolds by the pump. This minimizes bubbles and bubble growth when the completed crucible is used in a CZ process. Gas may be evacuated at a first pump flow rate until an inner fused layer of about 2.0 mm is formed and then at a second slower pump rate until fusion is complete in accordance with the method described in pending U.S. application Ser. No. 11/223,158, filed Sep. 8, 2005. But the present invention may also be implemented in methods that do not vary the pump flow rate during the entire fusion process.

The upper wall of a crucible so formed may slope in slightly and also may vary in thickness. As a result, after fusion, the upper portion of the crucible is cut off in a known manner. In FIG. 1, after fusion, the crucible is removed from the mold and is cut approximately along plane 49. This removes any defects that may exist in the upper portion. In the process depicted in FIG. 1, the distance from plane 49 to the uppermost portion of the fused crucible is much larger than necessary to remove defects. In other words, the defects typically occur near to the upper rim, and only about 5-20% of the formed crucible needs to be cut off to assure that the remainder of the crucible wall is well formed with a substantially constant thickness. But the process of FIG. 1 includes a much longer portion that is cut off. It is this additional length that increases the resistance to pump flow, which in turn enables use of a smaller flow rate pump to achieve the proper evacuation of fusion gas than if a shorter wall were formed.

There are disadvantages associated with prior art processes. First, forming a crucible in which only the upper 5-20% is cut requires the use of a large pump and large pipes to create and accommodate the pressures and gas flow just described. Using a tall wall in which 30% or more is removed as shown in FIG. 1, permits use of a smaller flow rate pump. But in this case, more silica and dopant is required to make the tall wall on the crucible, which is ultimately cut off. In short, the prior art requires a larger pump or more silica and dopant, and more power to run the larger pump or fuse more silica.

DESCRIPTION OF THE EMBODIMENTS

Figure 2:
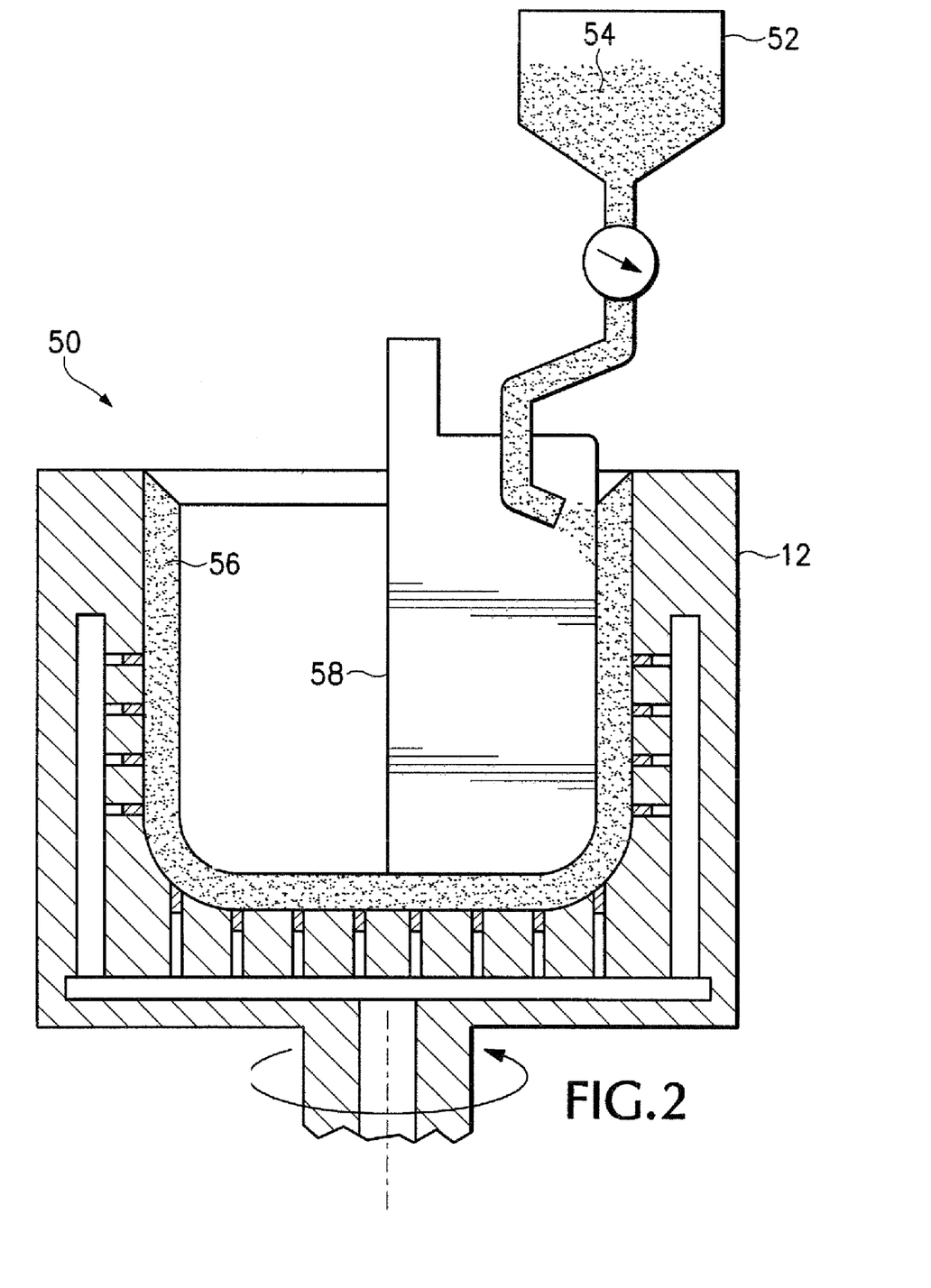
FIG. 2 is a cross-sectional, somewhat schematic view of a crucible being formed in accordance with the present invention.

Turning now to FIG. 2, indicated generally at 50 is a system for making crucibles in accordance with the present invention. Although system 50 includes a mold that is different from the prior art mold of FIG. 1, primarily because the mold depth is less, numbers identifying structure in system 50 that corresponds to structure in FIG. 1 are the same.

System 50 includes a hopper 52 in which silica grains 54 are received. As mold 12 rotates, grains are released from the hopper into the mold cavity. As a result of mold rotation, the silica grains are forced against the inner mold surface to form a wall 56. The outer layer of wall 56 may be doped in a known manner while the inner wall may be doped or undoped. But the present invention may be implemented regardless of which portions of the crucible are doped or even if it is entirely undoped.

In any event, a spatula 58 is lowered into the mold to the position shown in FIG. 2 to shape the radially inner surface of the crucible as the silica grains enter the rotating mold. As used herein, the term spatula refers to anything that can be used to form the grain into a desired shape.

Figure 3:
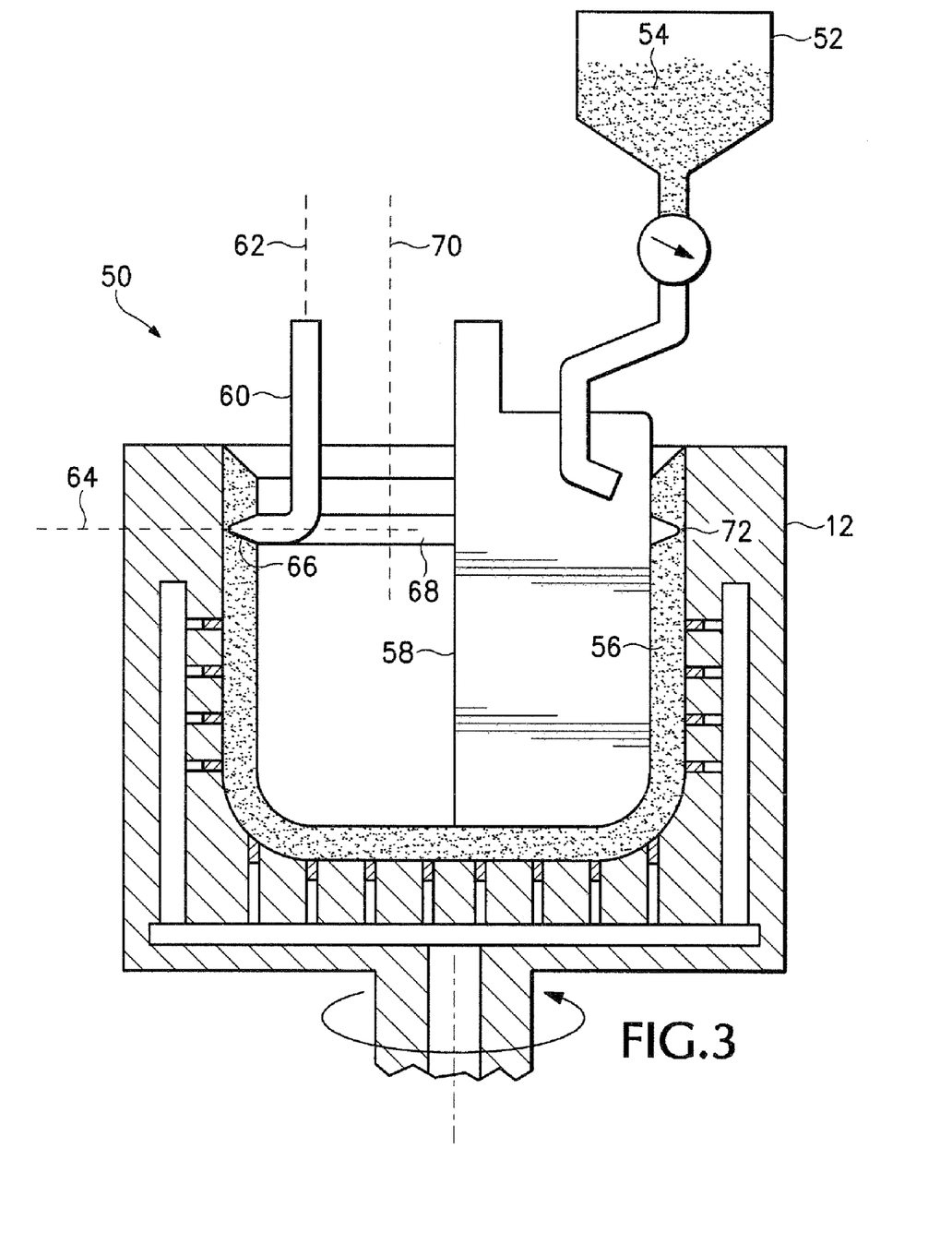
FIG. 3 depicts the crucible of FIG. 2 at a later stage in its formation.

Turning now to FIG. 3, after wall 56 is formed substantially into the shape shown in FIG. 2, a tool 60 having a longitudinal axis 62 and a transverse axis 64 is lowered into the mold cavity and positioned as shown. The tool has a conical end 66 that forms an annular trench 68 in wall 56 as the mold rotates.

In operation, tool 60 is positioned above the mold with axis 62 aligned with a vertical axis 70. Tool 60 is then lowered into the rotating mold until transverse axis 64 is opposite wall 56 at the desired center of trench 68. The tool is then moved laterally along axis 64 until it is positioned as shown in FIG. 3. This results in conical end 66 forming trench 68 in the wall as shown. It should be appreciated that axis 70 may be located anywhere that permits the tool to be lowered into the mold without contacting wall 56 as it is lowered. After trench 68 is formed, tool 60 is withdrawn laterally from trench 68 along axis 64 and then moved vertically, parallel to axis 70, to remove it from the mold. A narrowed wall portion 72 is defined between trench 68 and the radially outer surface of the crucible.

Figure 4:
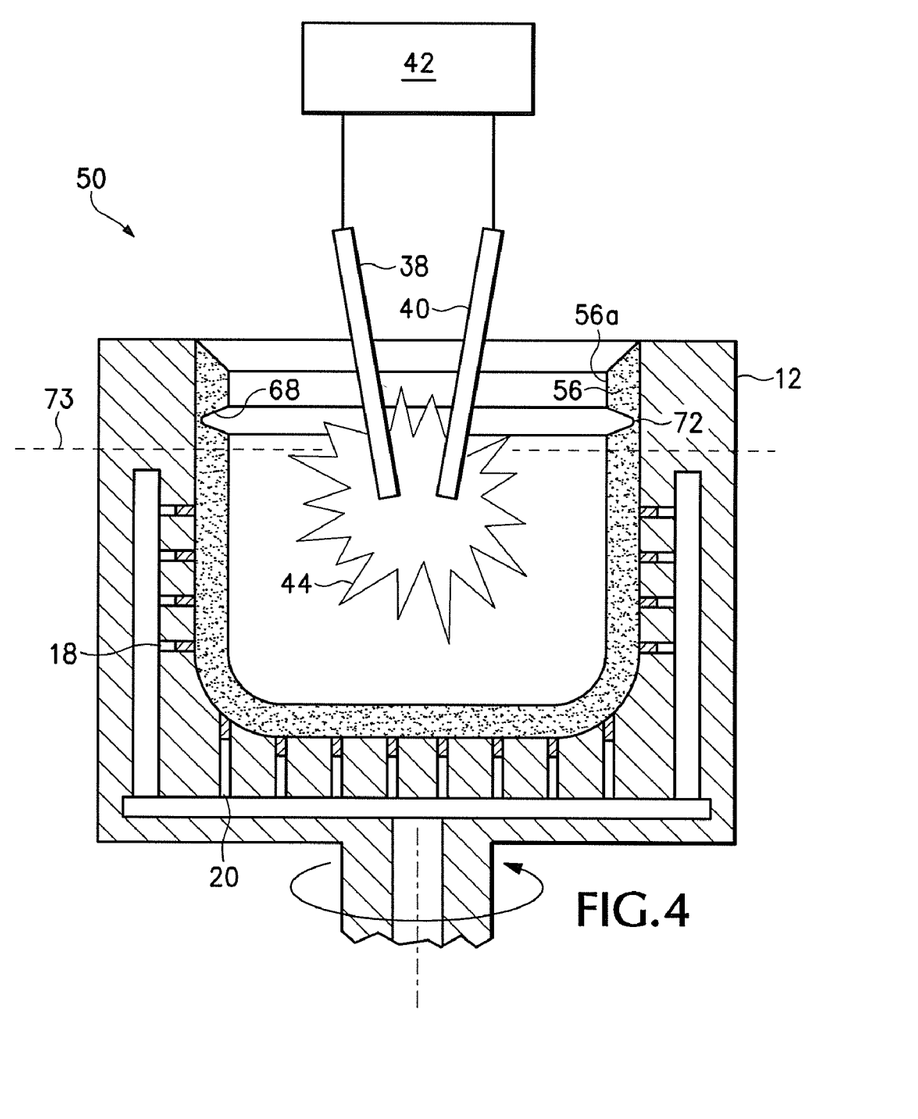
FIG. 4 depicts the crucible of FIG. 3 being fused.

In FIG. 4, the crucible shaped as shown in FIGS. 2 and 3 is being fused. Before power is applied to electrodes, the pump (not shown) is started, and air is drawn primarily from the interior of the mold through wall 56 and into the air channels, like air channels 18, 20. After electrodes 38, 40 are lowered to the position shown in FIG. 4 and power is applied, the innermost portion of the silica in wall 56 begins to fuse and forms an airtight layer 56a. As a result, air now enters the air channels only through the uppermost surface of wall 56. The air passes through the upper wall, through narrowed portion 72, through the lower wall, and into the air channels, like channels 18, 20. Narrowed portion 72 presents a higher resistance to air flow than the other portions of the wall as a result of the smaller cross-sectional area of silica through which the air flows in narrowed wall portion 72. As a result, there is a large pressure drop between the atmosphere around the upper portion of wall 56 and manifolds 28, 30, 32. This causes gas formed at the fusion front between layer 46a and the inner surface of mold 14 to be rapidly drawn away from the fusion front and into the manifolds by the pump. This minimizes bubbles and bubble growth when the completed crucible is used in a CZ process. Gas may be evacuated at a first pump flow rate until an inner fused layer of about 2.0 mm is formed and then at a second slower pump rate until fusion is complete in accordance with the method described in pending US application Ser. No. 11/223,158, filed Sep. 8, 2005. But the present invention may also be implemented in methods that do not vary the pump flow rate during the entire fusion process.

In FIG. 4, after fusion is complete, electrodes 38, 40 are withdrawn upwardly, and the crucible is removed from the mold. After cooling, it is cut approximately along plane 73. This removes any defects that may exist in the upper portion. In the process depicted in FIG. 4, the distance from plane 73 to the uppermost portion of the fused crucible is only about 20% of the formed crucible.

Figure 5:
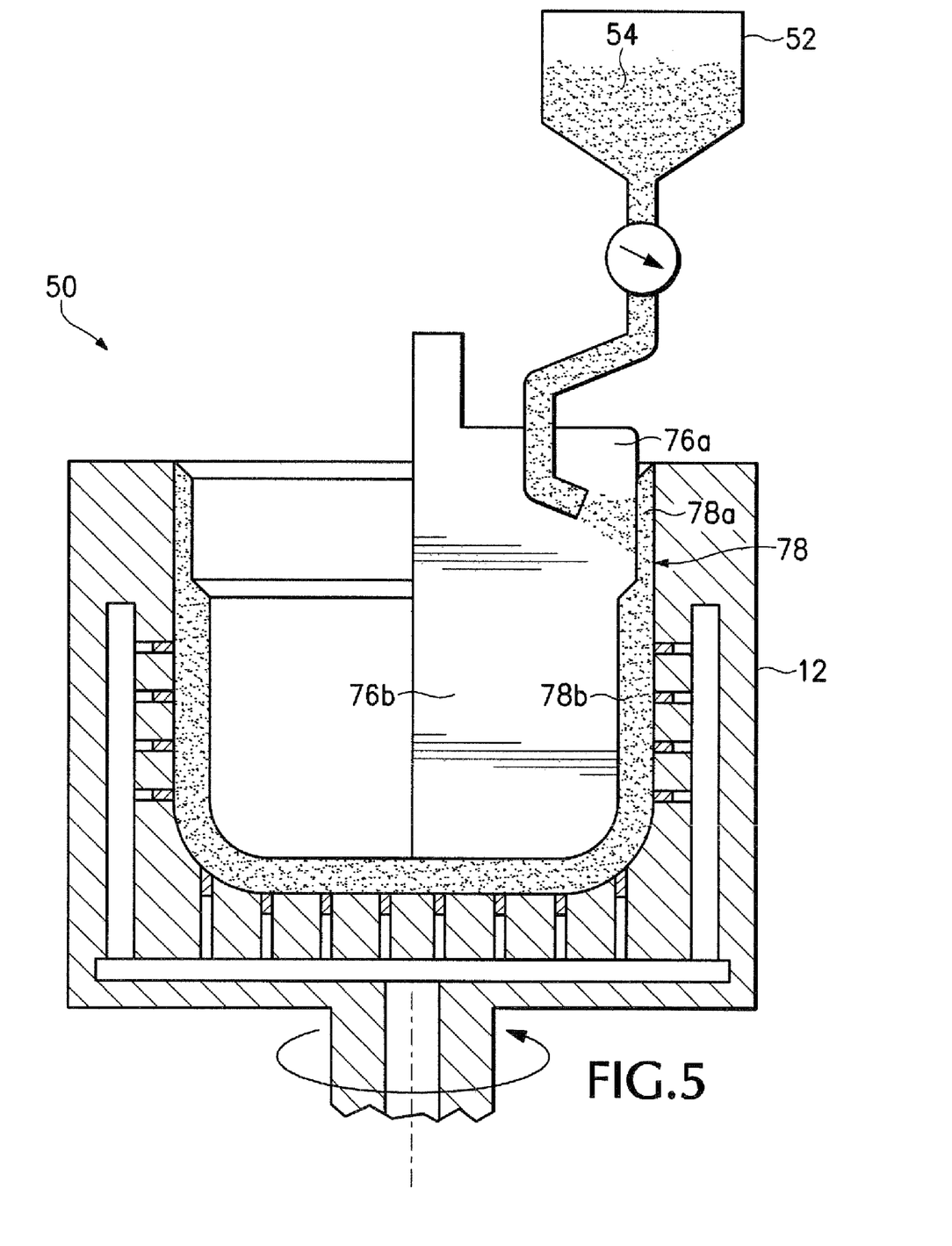
FIG. 5 is a cross-sectional, somewhat schematic view of another crucible being formed in accordance with the present invention.

Turning now to FIG. 5, system 50 is depicted during formation of another crucible according to the invention. As mold 12 rotates, grains are released from the hopper into the mold cavity. As a result of mold rotation, the silica grains are forced against the inner mold surface to form a wall 74. As with the previous formation of the crucible in FIGS. 2 and 3, the outer layer of wall 74 may be doped in a known manner while the inner wall may be doped or undoped. But which portions of the crucible are doped, or even if it is entirely undoped, does not affect implementing the process depicted in FIGS. 5 and 6.

In any event, a spatula 76 is lowered into the mold to the position shown in FIG. 5 to shape the radially inner surface of the crucible as the silica grains enter the rotating mold. Spatula 76 includes an upper portion 76a and a lower portion 76b. As can be seen, upper portion 76a as measured between the centerline of the mold and the radially outer edge of spatula 76 is wider than the width of lower portion 76b immediately beneath portion 76a. As a result, a crucible wall 78 is formed. It includes a narrowed wall portion 78a formed above a relatively thicker wall portion 78b. After the silica grains are shaped into a crucible as shown in FIG. 5, spatula 76 is withdrawn from the shaped crucible, which is now ready to be fused.

Figure 6:
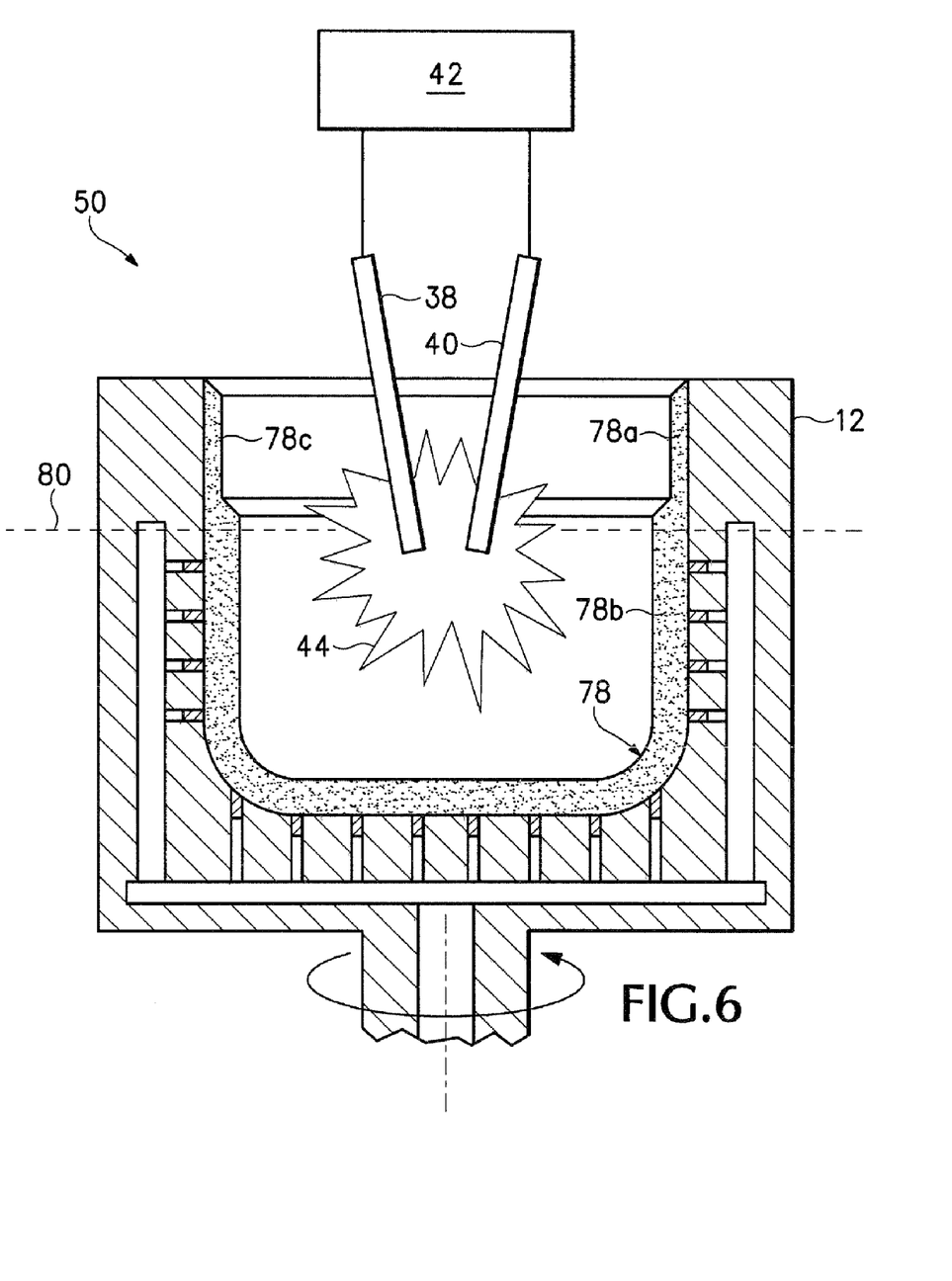
FIG. 6 depicts the crucible of FIG. 5 at a later stage in its formation.

In FIG. 6, electrodes 38, 40 are lowered into the crucible. Before power is applied to electrodes 38, 40, the pump (not shown) is started, and air is drawn primarily from the interior of the mold through wall 78 and into the air channels, like air channels 18, 20. After power is applied to electrodes 38, 40, the innermost portion of the silica in wall 78 begins to fuse and forms an airtight layer 78c. As a result, air now enters the air channels only through the uppermost surface of wall 78. The air passes through upper wall portion 78a, through lower wall 78b, and into the air channels, like channels 18, 20. Narrowed wall portion 78a presents a higher resistance to air flow than the other portions of the wall because there is a smaller cross-sectional (between layer 78c and the mold surface in upper portion 78a) through which the air flows. As a result, there is a large pressure drop between the atmosphere around the upper portion of wall 78 and manifolds 28, 30, 32. This causes gas formed at the fusion front between layer 76c and the inner surface of mold 14 to be rapidly drawn away from the fusion front and into the manifolds by the pump. This minimizes bubbles and bubble growth when the completed crucible is used in a CZ process. Gas may be evacuated at a first pump flow rate until an inner fused layer of about 2.0 mm is formed and then at a second slower pump rate until fusion is complete in accordance with the method described in pending U.S. application Ser. No. 11/223,158, filed Sep. 8, 2005. But the present invention may also be implemented in methods that do not vary the pump flow rate during the entire fusion process.

In FIG. 6, after fusion is complete, electrodes 38, 40 are withdrawn upwardly, and the crucible is removed from the mold. After cooling, it is cut approximately along plane 80. This removes any defects that may exist in the upper portion. In the process depicted in FIG. 6, the distance from plane 80 to the uppermost portion of the fused crucible is only about 15% of the formed crucible.

The method depicted in FIGS. 2-4 is more complex than the method of FIGS. 5-6, i.e., the method of FIGS. 5-6 is easier to implement. But the narrowed wall portion 78a is fragile, and the formed crucible must be handled with care. On the other hand, trench 68 in FIG. 5 can be made quite deep thereby producing a very narrow wall portion 72—narrower than wall portion 78a in FIGS. 5-6. As a result, the pressure drop described above in both methods may be greater in the method of FIGS. 2-4, which may be desirable.

EXAMPLES

The following chart depicts 9 examples and the results of a vacuum bake test for each. The vacuum bake test tests bubble growth in a formed crucible, or a portion of the crucible, that is subjected to the approximate conditions that the crucible is exposed to during the CZ process. After subjecting the formed crucible, or a portion thereof, to the vacuum bake test, the crucible is studied under a microscope to check for evolution of bubbles. In the following table, when no evolution of bubbles was observed, the result is shown as excellent. Test results that are acceptable but show scattered bubble evolution are shown as good.

|  | Units | 1 | 2 | 3 | 4 | 5 | 6 | 7 | 8 | 9 |
|---|---|---|---|---|---|---|---|---|---|---|
| Nominal size | inches | 18 | 18 | 18 | 22 | 22 | 24 | 24 | 32 | 32 |
| Crucible Height: H | mm | 360 | 380 | 380 | 430 | 420 | 410 | 460 | 550 | 650 |
| Mold product ratio: M/H | % | 135% | 118% | 118% | 130% | 119% | 157% | 107% | 124% | 105% |
| Fusion method | see note | C | B | D | C | B | C | D | A | D |
| Evacuation pump | m3/h | 350 | 350 | 700 | 350 | 350 | 350 | 700 | 350 | 700 |
| Vacuum bake test result |  | good | excellent | good | good | excellent | excellent | good | excellent | good |

Fusion method A comprises using the system and method of FIGS. 2-4.
Fusion method B comprises using the system and method of FIGS. 5-6.
Fusion method C comprises using the system and method of FIG. 1.
Fusion method D comprises using the system and method of pending US Application No. 11/223,158, filed Sep. 8, 2005.

It has been found that using prior art method C, in which the ratio of the depth of the mold M (also being the height of the fused crucible prior to cutting off the upper portion) to the height H of the final product (after cutting off the upper portion) produces excellent results when the ratio of M/H is greater than about 130% and preferably greater than about 140%.

The methods of FIGS. 2-4 and 5-6, however, can produce excellent results with less than about 120% of an M/H ratio. As a result, all of the savings associated with using shorter molds may be achieved in the methods of FIGS. 2-4 and 5-6.

The invention claimed is:

1. A method for making a silica glass crucible comprising:
   rotating a mold having an inner mold surface defining a mold cavity and further having a plurality of air channels formed in the mold and communicating with the inner surface;
   depositing silica grain in the rotating mold;
   forming the grain into the shape of a crucible having an upper portion that includes a generally upwardly directed upper surface and a lower portion that comprises a substantially uniformly thick wall;
   forming a substantially annular trench on an inner surface of the upper portion beneath the upper surface;
   heating the silica grain in the mold; and
   evacuating gas from the mold cavity with an evacuation system configured to draw gas from the mold cavity into the air channels.

2. The method of claim 1 wherein the method further includes:
   heating the silica grain until substantially all of the grain is fused;
   removing the fused silica from the mold; and
   cutting off the portion of the fused silica that contains the annular trench.

3. The method of claim 1 wherein the ratio of the height of the glass crucible prior to cutting off the portion of the fused silica that contains the annular trench to the height of the crucible after such cutting is less than about 120%.

4. The method of claim 1 wherein forming the annular trench comprises inserting a tool into the shaped grain.

5. The method of claim 4 wherein the inner mold surface is substantially cylindrical in shape and wherein inserting the tool into the shaped grain comprises moving a tool along a radial axis of the mold into the shaped grain.

6. The method of claim 5 wherein the method further comprises withdrawing the tool from the shaped grain along the radial axis and removing it from the mold.

7. The method of claim 1 wherein forming the grain into the shape of a crucible having a lower portion that comprises a substantially uniformly thick wall comprises urging a spatula against the grain in the rotating mold.

8. The method of claim 7 wherein the inner mold surface is substantially cylindrical in shape and wherein the method further comprises withdrawing the spatula from the mold and wherein forming an upper portion of the grain comprises:
  lowering a tool into the rotating mold; and
  moving the tool along a radial axis of the mold into the shaped grain.

9. The method of claim 8 wherein the method further comprises withdrawing the tool from the shaped grain along the radial axis and removing it from the mold.

10. A method for making a silica glass crucible comprising:
  rotating a mold having an inner mold surface defining a mold cavity and further having a plurality of air channels formed in the mold and communicating with the inner surface;
  depositing silica grain in the rotating mold;
  inserting a spatula into the mold, the spatula having a lower portion that forms the grain into the shape of a crucible having a substantially uniformly thick wall and an upper portion that forms the grain into a substantially narrowed wall portion about the perimeter of the formed shape;
  heating the silica grain in the mold; and
  evacuating gas from the mold cavity with an evacuation system configured to draw gas from the mold cavity into the air channels.

11. The method of claim 10 wherein the method further includes:
  heating the silica grain until substantially all of the grain is fused;
  removing the fused silica from the mold; and
  cutting off the portion of the fused silica that contains the narrowed wall portion.

12. The method of claim 11 wherein the ratio of the height of the glass crucible prior to cutting off the portion of the fused silica that contains the narrowed wall portion to the height of the crucible after such cutting is less than about 120%.

13. A method for making a silica glass crucible in which silica grain is deposited into a mold that has a plurality of air channels that communicate with the inner surface of the mold, the method comprising:
  rotating the mold;
  depositing silica grain into the mold;
  forming a lower portion of the grain into the shape of a crucible that comprises a substantially uniformly thick first wall having a first cross-sectional area;
  forming an upper portion of the grain into the shape of a crucible having a generally upwardly directed wall surface and further having a second cross-sectional area that is substantially less than the first cross-sectional area comprising a substantially annular trench beneath the generally upwardly directed wall surface;
  evacuating gas from the mold cavity through the surface of the formed grain;
  fusing the radially inner surface of the formed grain;
  evacuating gas from the mold cavity through the upwardly directed wall surface; and
  continuing to fuse the silica grain.

14. The method of claim 13 wherein the method further includes:
  heating the silica grain until substantially all of the grain is fused;
  removing the fused silica from the mold; and
  cutting off the portion of the fused silica that contains the second cross-sectional area.

15. The method of claim 14 wherein the ratio of the height of the glass crucible prior to cutting off the portion of the fused silica that contains the second cross-sectional area to the height of the crucible after such cutting is less than about 120%.

16. The method of claim 13 wherein forming an upper portion of the grain comprises inserting a tool into the upper portion of the grain.

17. The method of claim 16 wherein the inner mold surface is substantially cylindrical in shape and wherein inserting the tool into the upper portion of the grain comprises moving a tool along a radial axis of the mold into the upper portion of the grain.

18. The method of claim 17 wherein the method further comprises withdrawing the tool from the upper portion of the grain along the radial axis and removing it from the mold.

19. The method of claim 13 wherein forming a lower portion of the grain into the shape of a crucible comprises urging a spatula against the grain in the rotating mold.

20. The method of claim 19 wherein the inner mold surface is substantially cylindrical in shape and wherein the method further comprises withdrawing the spatula from the mold and wherein forming an upper portion of the grain comprises:
  lowering a tool into the rotating mold; and
  moving the tool along a radial axis of the mold into the upper portion of the grain.

21. The method of claim 20 wherein the method further comprises withdrawing the tool from the upper portion of the grain along the radial axis and removing it from the mold.

22. The method of claim 18 wherein forming the lower portion of the grain comprises urging a spatula against the grain in the rotating mold.

23. A method for making a silica glass crucible comprising:
  rotating a mold having an inner mold surface defining a mold cavity and further having a plurality of air channels formed in the mold and communicating with the inner surface;
  depositing silica grain in the rotating mold;
  forming the grain into the shape of a crucible having a lower portion that comprises a substantially uniformly thick wall and forming an upper portion of the grain that includes a substantially narrowed wall portion about the perimeter of the formed shape using a spatula against the grain in the rotating mold, the spatula having a lower portion that is generally parallel to the interior surface of the mold and an upper portion that extends radially outwardly from the lower portion to form the narrowed portion about the perimeter of the formed shape;
  heating the silica grain in the mold; and
  evacuating gas from the mold cavity with an evacuation system configured to draw gas from the mold cavity into the air channels.

24. The method of claim 23 wherein the method further includes:
  heating the silica grain until substantially all of the grain is fused;
  removing the fused silica from the mold; and
  cutting off the portion of the fused silica that contains the narrowed portion.

25. The method of claim 23 wherein the ratio of the height of the glass crucible prior to cutting off the portion of the fused silica that contains the narrowed portion to the height of the crucible after such cutting is less than about 120%.

26. A method for making a silica glass crucible in which silica grain is deposited into a mold that has a plurality of air channels that communicate with the inner surface of the mold, the method comprising:
- rotating the mold;
- depositing silica grain into the mold;
- forming a lower portion of the grain into the shape of a crucible that comprises a substantially uniformly thick first wall having a first wall cross-sectional area and forming an upper portion of the grain into a shape having a second cross-sectional area that is substantially less than the first cross-sectional area using a spatula against the grain in the rotating mold, the spatula having a lower portion that is generally parallel to the interior surface of the mold and an upper portion that extends radially outwardly from the lower portion to form the shape having the second cross-sectional area;
- evacuating gas from the mold cavity through the surface of the formed grain;
- fusing the radially inner surface of the formed grain;
- evacuating gas from the mold cavity through an upper surface of the second wall; and
- continuing to fuse the silica grain.

27. The method of claim 26 wherein the method further includes:
- heating the silica grain until substantially all of the grain is fused;
- removing the fused silica from the mold; and
- cutting off the portion of the fused silica that contains the second cross-sectional area.

28. The method of claim 27 wherein the ratio of the height of the glass crucible prior to cutting off the portion of the fused silica that contains the second cross-sectional area to the height of the crucible after such cutting is less than about 120%.

* * * * *

UNITED STATES PATENT AND TRADEMARK OFFICE
CERTIFICATE OF CORRECTION

| | |
|---|---|
| PATENT NO. | : 7,993,556 B2 |
| APPLICATION NO. | : 11/835568 |
| DATED | : August 9, 2011 |
| INVENTOR(S) | : Katsuhiko Kemmochi et al. |

It is certified that error appears in the above-identified patent and that said Letters Patent is hereby corrected as shown below:

Column 7, Line 53, the initial word "first" should be deleted.

Signed and Sealed this
Eighteenth Day of October, 2011

David J. Kappos
*Director of the United States Patent and Trademark Office*